(No Model.) 2 Sheets—Sheet 1.

G. B. & A. F. ROBINSON.
VARIABLE DRIVING GEAR.

No. 533,748. Patented Feb. 5, 1895.

WITNESSES:
Joshua Bergstrom
W. P. Hutchinson

INVENTORS
G. B. Robinson
A. F. Robinson
BY Munn & Co.
ATTORNEYS.

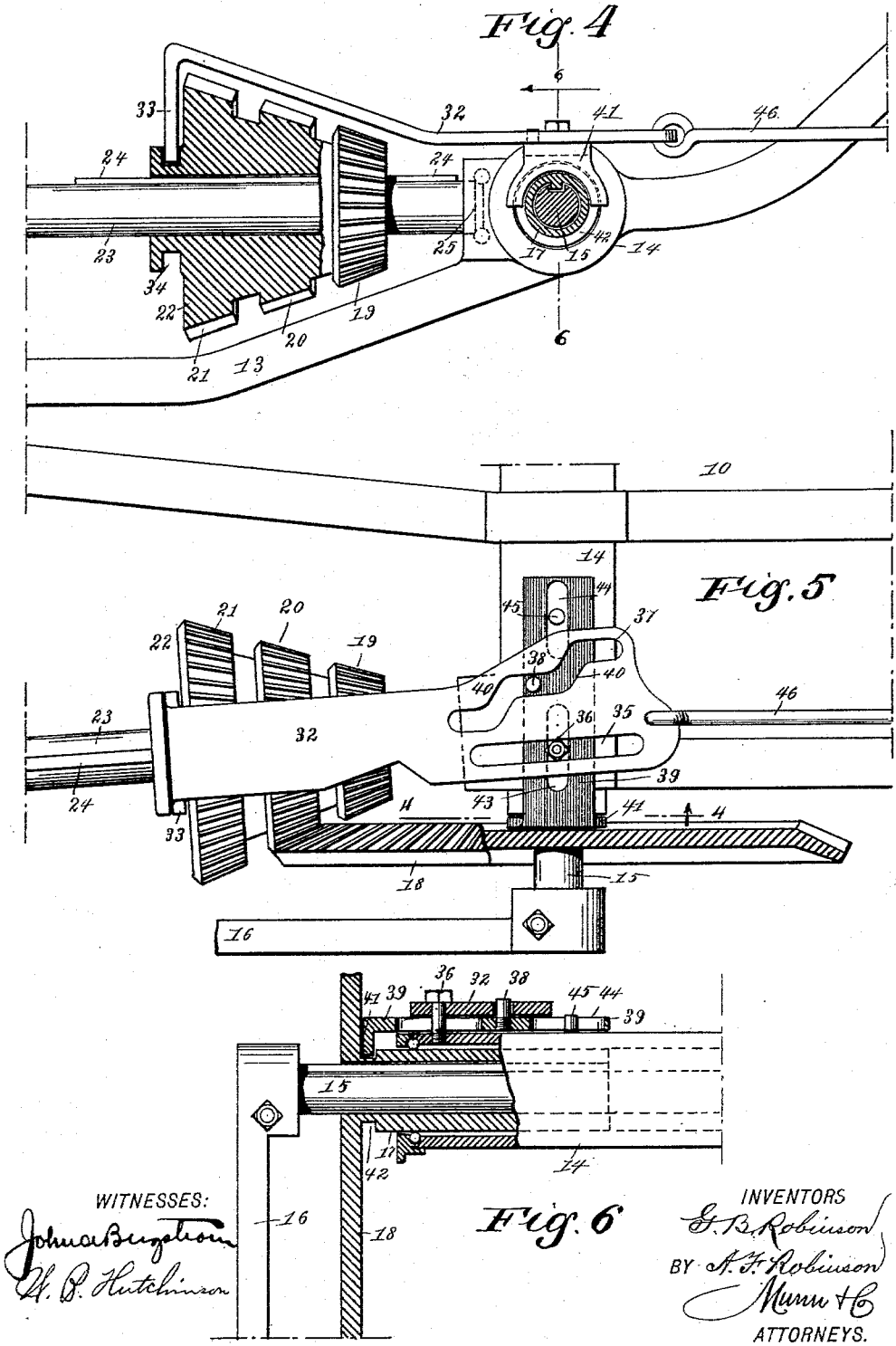

UNITED STATES PATENT OFFICE.

GEORGE B. ROBINSON AND AMY F. ROBINSON, OF COLORADO SPRINGS, COLORADO.

VARIABLE DRIVING-GEAR.

SPECIFICATION forming part of Letters Patent No. 533,748, dated February 5, 1895.

Application filed August 14, 1894. Serial No. 520,268. (No model.)

*To all whom it may concern:*

Be it known that we, GEORGE B. ROBINSON and AMY F. ROBINSON, both of Colorado Springs, in the county of El Paso and State of Colorado, have invented a new and Improved Variable Driving-Gear, of which the following is a full, clear, and exact description.

Our invention relates to improvements in variable or differential driving gears and particularly to such as are used in propelling safety bicycles.

Our invention is shown applied to a safety bicycle, although it may be used for propelling other pedal operated machines; and the object of our invention is to produce a cheap, simple and strong gear, which may be applied to any ordinary bicycle, which dispenses with with the use of a sprocket wheel and chain, and which may be readily changed from a high to a low speed or vice versa, thus enabling the machine to be very easily adapted for use on hard or easy roads.

A further object of our invention is to produce a gear which has the shifting parts arranged in such a simple and easy working way that there is very little danger of their getting out of order.

To these ends our invention consists of certain features of construction and combinations of parts, which will be hereinafter described and claimed.

Reference is to be had to the accompanying drawings, forming a part of this specification, in which similar figures of reference indicate corresponding parts in all the views.

Figure 1:
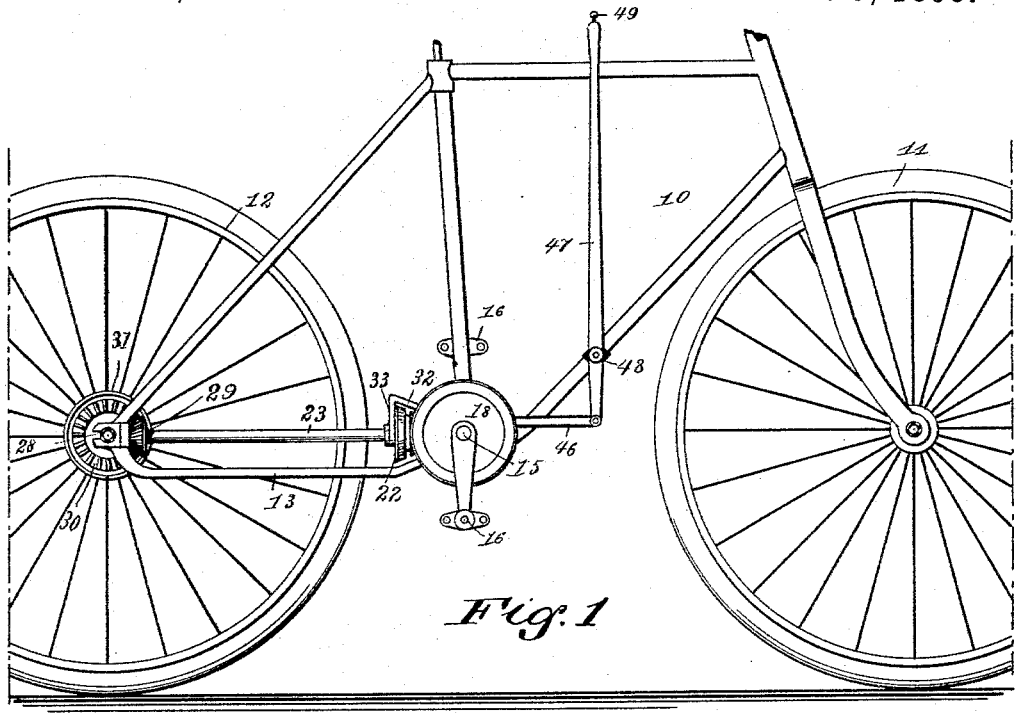
Figure 2:
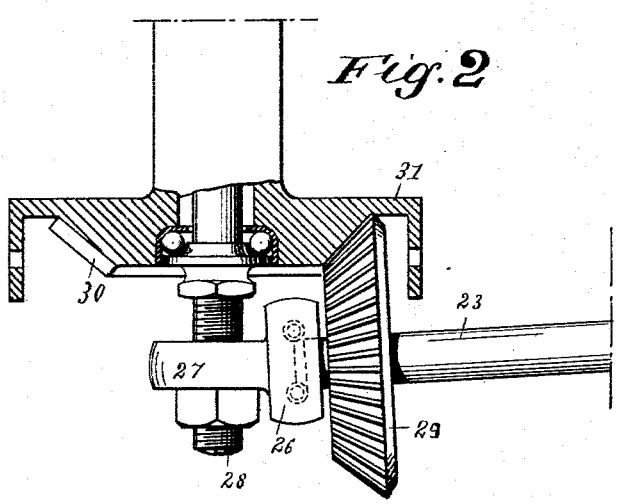
Figure 3:
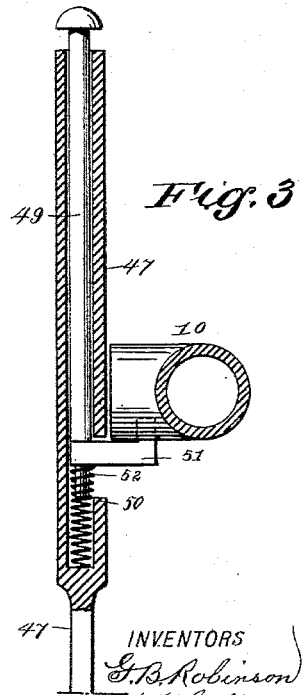

Figure 1 is a broken side elevation of a bicycle provided with our improved driving gear. Fig. 2 is a sectional plan of that part of the gear which connects with the hub of the rear bicycle wheel. Fig. 3 is an enlarged detail longitudinal section of the handle part of the shifting lever and the locking device for holding it. Fig. 4 is an enlarged sectional elevation on the line 4—4 of Fig. 5. Fig. 5 is a broken plan view, partly in section, of the shifting mechanism and that portion of the gearing which is arranged adjacent to the pedal shaft; and Fig. 6 is a broken sectional elevation of the bearing of the gear.

The machine is provided with customary frame 10 and with the front and rear wheels 11 and 12, but the frame is slightly modified to suit the gear, the lower bars 13 of the frame being bent slightly downward, as shown in Fig. 1. The frame has the customary box 14 through which extends the pedal shaft 15 which has the ordinary crank pedals 16, and in this box is a sleeve 17 which is journaled on ball bearings of any usual or suitable kind, this sleeve being keyed to the shaft, as shown in Fig. 4, so that it turns with the shaft but may slide longitudinally thereon, and at one end the sleeve projects from the box 14 and carries a beveled gear wheel 18 which is adapted to engage the several toothed faces 19, 20, and 21 of the cone gear 22 which is mounted on the driving shaft 23 and is slidable on a key 24 on the shaft.

The shaft 23 extends rearward from the pedal shaft to the hub of the rear wheel 12 and is hung, at its forward end, in a ball bearing 25 and at its rear end in a bearing 26 carried by a nut 27 which is secured to the rear axle 28, and the rear end of the shaft carries a beveled gear wheel 29 which meshes with a gear wheel 30 on the hub 31 of the rear bicycle wheel and thus, when the driving shaft 23 is turned it transmits its motion to the gear wheel 30 and propels the machine.

It will be seen that when the face 19 of the cone gear meshes with the gear wheel 18 the machine will be driven at a high speed and with comparatively little power, while when the gear wheel meshes with the faces 20 and 21 of the cone gear, the speed is decreased and the power increased. The cone gear is shipped by a shipping fork 32, which is arranged parallel with the shaft 23, and above the cone gear, the fork having its rear end bent downward, as shown at 33, so as to engage a groove 34 in the hub of the cone gear, and the fork extends above the box 14 and is provided with a straight slot 35 which slides on a guide screw 36 which is fastened in the box 14, and it also has a cam groove or slot 37 which slides on a pin 38 in a second fork 39 which is used for shifting the gear wheel 18, as described presently, the slot 37 having a series of bends 40 in it, which by engaging the stud or pin 38 moves the fork 39. The fork 39 has its outer end 41 bent downward so as to engage a groove 42 in the sleeve 17, thus enabling the sliding of the fork 39 to move the sleeve and its gear wheel 18. The shipping fork 39 is provided with slots 43 and 44, the former of which receives the screw 36 and the latter of which receives a stud or pin 45 on the box 14, so that the fork is properly guided.

It will be seen that when the fork 32 is moved longitudinally to shift the cone gear 22, the walls of the cam slot 37, acting on the pin 38, will move the shipping fork 39 and gear wheel 18 so that both forks are simultaneously moved and thus the gear wheel 18 is sure to engage one face of the cone gear. The fork 32 is moved lengthwise by means of a pitman 46 and a lever 47, with which the pitman connects, this lever being fulcrumed, as shown at 48, on the lower portion of the frame 10 and it extends upward to the upper bar of the frame so that the rider may easily grasp it and move it backward or forward in order to shift the gear.

The upper or handle portion of the lever 47 is hollow and in it is a slide rod 49 which is pressed upward by a spring 50, see Fig. 3, and this rod carries a latch 51 which extends outward through a slot 52 in the lever and is adapted to engage notches in the top bar of the frame 10, as shown in Fig. 3, and thus the lever and shipping fork may be locked in a desired position.

It will be seen that the only thing necessary to shift the gear is to depress the rod 49 so as to release the latch 51 and then move the lever 47 backward or forward, as the case may be, and this moves the fork 32 and cone gear 22 while the fork 32 also actuates the fork 39, as above described, and slides the gear wheel 18 so that the two gears are sure to mesh.

It will be understood that the gears at the pedal shaft and also at the rear end of the driving shaft 23 may be easily cased in if desired.

Having thus described our invention, we claim as new and desire to secure by Letters Patent—

1. The combination, with the pedal shaft and the driving shaft arranged adjacent thereto, of the gear wheel slidable on the pedal shaft, the cone gear slidable on the driving shaft and adapted to engage the first gear, and shipping mechanism for simultaneously sliding both gears, substantially as described.

2. The combination, with the bicycle and its pedal shaft, of the driving shaft geared to the rear wheel of the bicycle and provided with a cone gear which is slidable on the shaft, a gear wheel slidable on the pedal shaft and adapted to engage the cone gear, and shipping mechanism for sliding both gears, substantially as described.

3. The combination, with the bicycle and the pedal shaft, of the driving shaft geared to the rear bicycle wheel and extending forward near the pedal shaft, a cone gear slidable on the driving shaft, a sleeve slidable on the pedal shaft and provided with a gear wheel which meshes with the cone gear, and a lever mechanism for simultaneously shipping both gears, substantially as described.

4. The combination, with the pedal shaft, the gear wheel slidable thereon, the driving shaft and the slidable cone gear on the driving shaft to engage the gear of the pedal shaft, of the sliding shipping fork to move the cone gear, a second shipping fork to move the pedal shaft gear, and an operative connection between the two forks whereby the two are simultaneously moved, substantially as described.

5. The combination, with the pedal shaft, the slidable gear thereon, the driving shaft and the cone gear held to slide on the driving shaft and engage the gear of the pedal shaft, of the shipping fork to move the pedal shaft gear, the shipping fork to move the cone gear, and means, as the cam slot in the second fork and the stud in the first, to cause the simultaneous movement of the two forks, substantially as described.

6. The combination, with the pedal shaft, the driving shaft and the meshing and shifting gears on the two shafts, of the connected shipping forks adapted to move the gears, the tilting lever connected with one of the forks to move it, and a lock for the lever, substantially as described.

GEORGE B. ROBINSON.
AMY F. ROBINSON.

Witnesses:
JOHN PEDERSON,
WILLIAM I. WHARTON.